US012330615B2

(12) United States Patent
Huelsmann et al.

(10) Patent No.: US 12,330,615 B2
(45) Date of Patent: Jun. 17, 2025

(54) METHOD AND MOTOR VEHICLE

(71) Applicant: Bayerische Motoren Werke Aktiengesellschaft, Munich (DE)

(72) Inventors: Florian Huelsmann, Munich (DE); Andreas Lorch, Aresing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 333 days.

(21) Appl. No.: 17/795,907

(22) PCT Filed: Feb. 9, 2021

(86) PCT No.: PCT/EP2021/053008
§ 371 (c)(1),
(2) Date: Jul. 28, 2022

(87) PCT Pub. No.: WO2021/197694
PCT Pub. Date: Oct. 7, 2021

(65) Prior Publication Data
US 2023/0086051 A1 Mar. 23, 2023

(30) Foreign Application Priority Data
Apr. 2, 2020 (DE) ...................... 10 2020 109 232.6

(51) Int. Cl.
*B60T 8/17* (2006.01)
*B60T 8/1755* (2006.01)
(Continued)

(52) U.S. Cl.
CPC .......... *B60T 8/1706* (2013.01); *B60T 8/1755* (2013.01); *B60T 8/261* (2013.01); *B60W 10/06* (2013.01);
(Continued)

(58) Field of Classification Search
CPC ...... B60T 8/1706; B60T 8/1755; B60T 8/261; B60T 2260/09; B60T 2270/303;
(Continued)

(56) References Cited

U.S. PATENT DOCUMENTS 9,346,510 B2 * 5/2016 Watanabe ............ G05D 1/0891
9,381,914 B2 * 7/2016 Klews ................... B60W 10/18
(Continued)

FOREIGN PATENT DOCUMENTS

CN 106660565 A 5/2017
CN 107848509 A 3/2018
(Continued)

OTHER PUBLICATIONS

International Search Report (PCT/ISA/210) issued in PCT Application No. PCT/EP2021/053008 dated Jun. 17, 2021 with English translation (five (5) pages).
(Continued)

*Primary Examiner* — Christopher P Schwartz
(74) *Attorney, Agent, or Firm* — Crowell & Moring LLP

(57) ABSTRACT

A method and a system for decelerating a single-track motor vehicle, includes using a control unit to determine a total torque of a wheel of the motor vehicle required for a desired riding maneuver, in particular a controlled slip of a rear wheel, determine, a braking partial torque and a motor partial torque as a function of the total torque required, and generate the braking partial torque on the wheel by controlling a brake system of the motor vehicle and generating the motor partial torque on the wheel by controlling a motor of the motor vehicle The invention further includes a single-track motor vehicle configured to execute the decelerating method.

14 Claims, 2 Drawing Sheets

(51) Int. Cl.
  *B60T 8/26* (2006.01)
  *B60W 10/06* (2006.01)
  *B60W 10/184* (2012.01)
  *B60W 30/18* (2012.01)

(52) U.S. Cl.
  CPC .... *B60W 10/184* (2013.01); *B60W 30/18109* (2013.01); *B60T 2260/09* (2013.01); *B60T 2270/303* (2013.01); *B60T 2270/304* (2013.01); *B60W 2300/36* (2013.01)

(58) Field of Classification Search
  CPC ............. B60T 2270/304; B60W 10/06; B60W 10/184; B60W 30/18109
  USPC .................. 303/9.64; 701/68, 70–72, 83
  See application file for complete search history.

(56) References Cited

U.S. PATENT DOCUMENTS

| | | |
|---|---|---|
| 2014/0200780 A1 | 7/2014 | Watanabe et al. |
| 2015/0203110 A1 | 7/2015 | Moerbe |
| 2015/0314781 A1 | 11/2015 | Klews et al. |
| 2016/0009275 A1 | 1/2016 | Hieda et al. |
| 2017/0247042 A1 | 8/2017 | Seidl |
| 2018/0178769 A1 | 6/2018 | Raste et al. |

FOREIGN PATENT DOCUMENTS

| | | |
|---|---|---|
| DE | 10 2008 011 575 A | 9/2008 |
| DE | 10 2012 211 963 A1 | 1/2014 |
| DE | 10 2012 222 884 A1 | 6/2014 |
| DE | 10 2014 223 463 A1 | 5/2016 |
| DE | 10 2016 200 500 A1 | 7/2017 |
| WO | 2014/090439 A1 | 6/2014 |

OTHER PUBLICATIONS

German-language Written Opinion (PCT/ISA/237) issued in PCT Application No. PCT/EP2021/053008 dated Jun. 17, 2021 (five (5) pages).

German-language Search Report issued in German Application No. 10 2020 109 232.6 dated Sep. 14, 2020 with partial English translation (12 pages).

Cover Page of EP 2 931 578 A1 published Oct. 21, 2015 (1 page).

English translation of Chinese-language Office Action issued in Chinese Application No. 202180008941.8 dated Feb. 26, 2025 (8 pages).

* cited by examiner

METHOD AND MOTOR VEHICLE

BACKGROUND AND SUMMARY OF THE INVENTION

The invention relates to a method for decelerating a single-track motor vehicle and a motor vehicle.

The deceleration of a motor vehicle is typically used for the controlled velocity reduction of the motor vehicle, for example, to approach a curve at adequate velocity.

Above all using single-track motor vehicles, curves are generally approached in a sporty manner. To achieve better turning in and braking behavior in this case, it is possible to decelerate the motor vehicle using a so-called "slide". Such a slide represents controlled, intentional overbraking of the rear wheel, wherein a high slip results on the rear wheel and its lateral guidance force is reduced. The higher the slip, the lower the lateral guidance force and the higher the slip angle (slide).

Above all, a stronger deceleration of the motor vehicle can be achieved by the slide, for example, during the braking for a curve, than in the case of a normal braking process. It is thus possible to start braking for the curve later and thus be able to drive through the curve faster.

However, such a controlled, stable slide is difficult to achieve.

The object of the invention is to provide a method and a motor vehicle using which a controlled slide can be achieved easily.

This object is achieved according to the invention by a method for decelerating a single-track motor vehicle, in particular a motorcycle, having the following steps:
  a) determining a total torque of a wheel required for a desired driving maneuver, in particular a rear wheel of the motor vehicle, by way of a control unit of the motor vehicle,
  b) ascertaining a braking partial torque and an engine partial torque by way of the control unit as a function of the required total torque, and
  c) generating the braking partial torque at the wheel, in particular at the rear wheel, by activating a braking system of the motor vehicle by way of the control unit and generating the engine partial torque at the wheel, in particular at the rear wheel, by activating an engine of the motor vehicle by way of the control unit.

The core concept of the invention is accordingly the combined activation of a braking system and in addition an engine of the single-track motor vehicle to jointly generate a total torque on the wheel, in particular on a rear wheel of the single-track motor vehicle. High braking torques can be generated on the wheel by the braking system, however, with low accuracy and control speed. The engine offers high accuracy and control speed, but with limited torque range. A wider torque range can be covered with high accuracy and control speed by the combined activation of these two actuators.

It can be provided for this purpose that the partial torques and accordingly also the total torque—in relation to a forward running direction of the wheels of the single-track motor vehicle—are braking torques, i.e., the initial torque of the wheel is reduced by the braking system activated by the control unit and by the activated engine to the total torque.

Alternatively, the engine partial torque—in relation to a forward running direction of the wheels of the single-track motor vehicle—can be an acceleration torque, i.e., the initial torque of the wheel is increased by the engine activated by the control unit to the total torque. Accordingly, the value of the engine partial torque after the activation of the motor is higher than before the activation.

In particular, the engine partial torque is controlled by an engine drag torque control. An operational coupling of the engine and the rear wheel is always present in single-track motor vehicles. Accordingly, no further mechanism has to be provided to apply the engine partial torque at the rear wheel. The engine partial torque can accordingly be controlled easily by the engine drag torque control without further need for additional components and control units.

For example, the driving maneuver can be controlled overbraking of the rear wheel during the initial braking for a curve, due to which higher slip results at the rear wheel. The lateral guidance force of the rear wheel is reduced and the slip angle of the rear wheel is increased. A stronger deceleration of the motor vehicle can thus be achieved than during a normal initial braking process.

The slip angle of the rear wheel represents a "slide" of the rear wheel in this case.

The braking partial torque and the engine partial torque can in sum result in the required total torque. In this way, the advantages of the braking system (generating higher braking torques) and of the engine (high accuracy and control speed) can be unified to apply exactly the required total torque at the wheel.

In particular, the control unit recognizes before or during the desired driving maneuver that the driver wishes to execute the desired driving maneuver. The recognition can take place automatically, on the one hand, or can be manually induced, on the other hand.

The automatic recognition can take place on the basis of various vehicle parameters, for example, a current brake pressure on the rear wheel brake and/or the front wheel brake, a current inertial state of the motor vehicle, in particular a current inclination and a current sideslip angle, the current deceleration, and a current velocity of the motor vehicle.

In the case of the manual indication, it can be communicated to the control unit by the driver chronologically before or during the desired driving maneuver by manual actuation of a trigger that the desired driving maneuver is to be carried out during the next deceleration of the motor vehicle or now—when the motor vehicle is presently being decelerated.

The trigger can be, for example, a manual input by the driver on one of the input devices.

Additionally or alternatively, a brief manual actuation of the rear wheel brake by the driver can be used as the trigger.

One embodiment provides that the braking system has a brake controller which represents a part of the control unit, in particular wherein the braking system comprises an antilock braking system (ABS) and/or that the motor vehicle has an engine controller which represents a part of the control unit. Since in modern motor vehicles a brake controller and ABS and an engine controller are generally provided, the method can be integrated very easily.

The brake controller can represent the controller of the ABS. Accordingly, an additional controller does not have to be provided for the ABS, which saves installation space, production expenditure, and costs.

The brake controller and the engine controller can be coupled to one another for signaling, so that items of information or detected data of a sensor system can be exchanged, in particular bidirectionally, between the brake controller and the engine controller. In this way, the braking system and the engine can be activated in dependence on one another.

In particular, the engine is activated in dependence on the braking partial torque generated by the braking system, so that the engine partial torque generated by the engine is dependent on the braking partial torque.

It can be provided that the following further steps are carried out to generate the braking partial torque at the wheel, in particular at the rear wheel:
- ascertaining a setpoint brake pressure of the braking system as a function of the ascertained braking partial torque by way of the control unit, in particular the brake controller, and
- generating the braking partial torque by actuating the brake of the braking system by way of the control unit using the ascertained setpoint brake pressure.

In this way, the braking system can be activated fully automatically using the required setpoint brake pressure to achieve a controlled slide by the control unit, in particular by the brake controller. Initiating the controlled slide is thus significantly simplified, since the setpoint brake pressure is generated without the driver of the motor vehicle having to actuate the rear wheel brake himself.

Alternatively, the braking system, in particular the rear wheel brake, can be actuated by the driver, wherein the brake controller represents a brake pressure limit of the rear wheel brake by which the brake pressure applied by the driver is set to the setpoint brake pressure, in particular reduced. In other words, the brake pressure applied by the driver can be reduced to the setpoint brake pressure by activating the braking system by way of the control unit, in particular the brake controller. The control unit, in particular the brake controller, thus limits, with incorporation of various parameters, a brake pressure applied by the driver of the motor vehicle to the setpoint brake pressure which is necessary to initiate the controlled slide of the wheel. This partial function takes away the correct metering of the rear wheel brake from the driver, since he only has to actuate it strongly while the brake controller sets the actually required setpoint brake pressure. Excessively strong overbraking is thus prevented and the initiation of the controlled slide is significantly simplified.

The following further steps can be carried out to generate the engine partial torque:
- ascertaining a setpoint torque of the engine on the basis of the ascertained engine partial torque, and
- generating the engine partial torque by regulating the engine to the setpoint torque by way of the control unit, in particular the engine controller.

The required engine partial torque for generating a controlled slide of the wheel, in particular the rear wheel, can thus be set very accurately and quickly.

In particular, the torque of the engine is increased to the setpoint torque for this purpose. A greater torque range is available upon an increase of the engine torque than upon a decrease of the engine torque. It is accordingly advantageous if the braking partial torque is somewhat less than the desired total torque and the current torque on the wheel, in particular on the rear wheel, resulting due to the braking partial torque is increased very accurately to the desired total torque by the engine partial torque.

As a whole, the braking partial torque which ensures the overbraking of the wheel, in particular the rear wheel, is thus roughly generated via the braking system, in particular by means of the brake controller. The current torque on the wheel is finely adjusted by the engine, in particular by means of the engine controller, for example, by increasing the engine torque to the setpoint torque, so that a controlled slide matching with the current state of the motor vehicle is initiated.

For example, the regulation of the engine to the ascertained setpoint torque is carried out by activating the entire engine, individual cylinders, and/or individual cylinder banks of the engine. In this way, a regulation of the engine, which is adapted to the current state of the motor vehicle and is accordingly efficient, to the ascertained setpoint torque can be ensured.

One aspect provides that the total torque, the braking partial torque, in particular the setpoint brake pressure, and/or the engine partial torque, in particular the setpoint torque, is ascertained on the basis of a current steering angle, a current wheel speed of a front wheel, a current wheel speed of the rear wheel, a current vehicle velocity, a current slip of the front wheel, a current slip of the rear wheel, a current inertial state, in particular a current inclination and/or a current sideslip angle of the motor vehicle, a selected driving mode, and/or a brake pressure applied by the driver, in particular on the front wheel. The total torque matching with the current state of the motor vehicle can thus be ascertained, which is necessary to initiate a stable, controlled slide of the rear wheel.

The inertial state can comprise an inclination, a sideslip angle, and/or the like.

In particular, it is provided that the braking partial torque, in particular the setpoint brake pressure, is ascertained from the current deceleration and/or the current vehicle velocity of the motor vehicle. The deceleration is ascertained, on the one hand, on the basis of the inertial state, for example, measured by an inertial sensor system, and, on the other hand, from the brake pressure applied at the front wheel. In this way, controlled overbraking of the rear wheel can be achieved without endangering the stable position of the motor vehicle. Furthermore, the correct metering of the rear wheel brake is thus taken away from the driver, since he only has to strongly actuate it while the control unit, in particular the brake controller and the ABS, sets the actually required braking partial torque, in particular the actually required setpoint brake pressure.

Furthermore, it can be provided that the engine partial torque, in particular the setpoint torque, is determined by the slip at the rear wheel. The engine controller, in particular an engine drag torque control, determines the slip at the rear wheel and sets this to a setpoint value by increasing the engine torque. The setpoint value results in this case, on the one hand, from the inertial state, in particular from the inclination and/or the sideslip angle, and, on the other hand, from the deceleration and/or the vehicle velocity of the motor vehicle.

Optionally, various settings, for example, wheel properties such as the tire type, and/or driving modes, for example, sporty mode having particularly strongly pronounced slide behavior, which have influence on the deceleration behavior of the motor vehicle, can be used to ascertain the total torque or the partial torques.

Furthermore, the object is achieved according to the invention by a single-track motor vehicle, in particular a motorcycle, which has a front wheel and a rear wheel, a braking system having a front wheel brake and a rear wheel brake, an engine, at least one sensor system, and a control unit coupled to the braking system, the engine, and the sensor system, which is designed to carry out the above-described method. Such a single-track motor vehicle has a combined control of the rear wheel torque during the deceleration of the motor vehicle, in which a total torque is generated at the rear wheel by a combination of brake-induced braking partial torque at the rear wheel and engine-induced engine partial torque at the rear wheel. This total torque is selected so that the rear wheel is overbraked in a controlled manner and thus a controlled, stable slide of the rear wheel is initiated, by which better turning in and braking behavior of the motor vehicle is achieved.

The motor vehicle can additionally have a brake controller, in particular having ABS, and an engine controller, in particular an engine drag torque control, which can be a part of the control unit.

For example, the sensor system comprises a brake pressure sensor system, a steering angle sensor system, an inertial measurement sensor system, in particular at least one acceleration sensor and/or at least one rotation rate sensor, and/or a wheel speed sensor system. Comprehensive items of information on the state of the motor vehicle can thus be detected, which are necessary to ascertain the total torque or the partial torques.

The described advantages and features of the method according to the invention apply similarly to the single-track motor vehicle and vice versa.

Further advantages and features of the invention result from the following description and from the appended drawings, to which reference is made.

DETAILED DESCRIPTION

Figure 1:
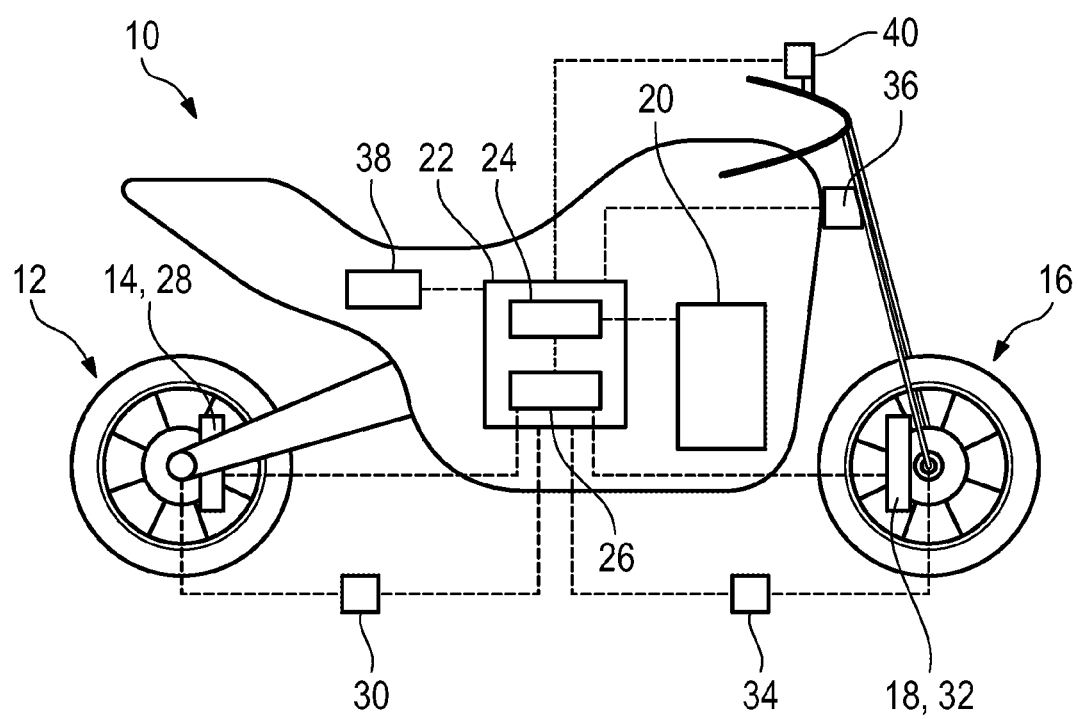
FIG. 1 shows a schematic side view of a single-track motor vehicle according to an embodiment of the invention.

FIG. 1 shows a single-track motor vehicle 10 according to the invention having a rear wheel 12 and a rear wheel brake 14 and a front wheel 16 and a front wheel brake 18, an engine 20, and a control unit 22.

The control unit 22 comprises an engine controller 24 coupled to the engine 20 and a brake controller 26 coupled to the rear wheel brake 14 and the front wheel brake 18.

The engine controller 24 accordingly controls the engine 20 and the brake controller 26 accordingly controls the rear wheel brake 14 and the front wheel brake 18.

The rear wheel brake 14 and the front wheel brake 18 together represent a braking system of the motor vehicle 10, which can comprise an antilock braking system (ABS). The brake controller 26 can also be the controller of the ABS.

The engine controller 24 and the brake controller 26 can be a part of the control unit 22 or can each form an independent, separate controller.

In the embodiment shown here, the engine controller 24 and the brake controller 26 are part of the control unit 22 and have a data connection to one another.

Furthermore, the motor vehicle 10 has a plurality of sensor systems, which are coupled to the control unit 22.

At the rear wheel 12, the motor vehicle 10 has, on the one hand, a rear wheel-brake pressure sensor system 28 and, on the other hand, a rear wheel-wheel speed sensor system 30.

At the front wheel 16, the motor vehicle 10 has, on the one hand, a front wheel-brake pressure sensor system 32 and, on the other hand, a front wheel-wheel speed sensor system 34.

Moreover, the motor vehicle 10 has a steering angle sensor system 36 and an inertial measurement sensor system 38.

The inertial measurement sensor system 38 can comprise, for example, three acceleration sensors and three rotation rate sensors, by which, inter alia, an inclination and a sideslip angle of the motor vehicle 10 can be detected.

The motor vehicle 10 can optionally have one or more user interface(s), for example, in the form of one input device 40 or multiple input devices 40, which has or have a data connection to the control unit 22.

Figure 2:
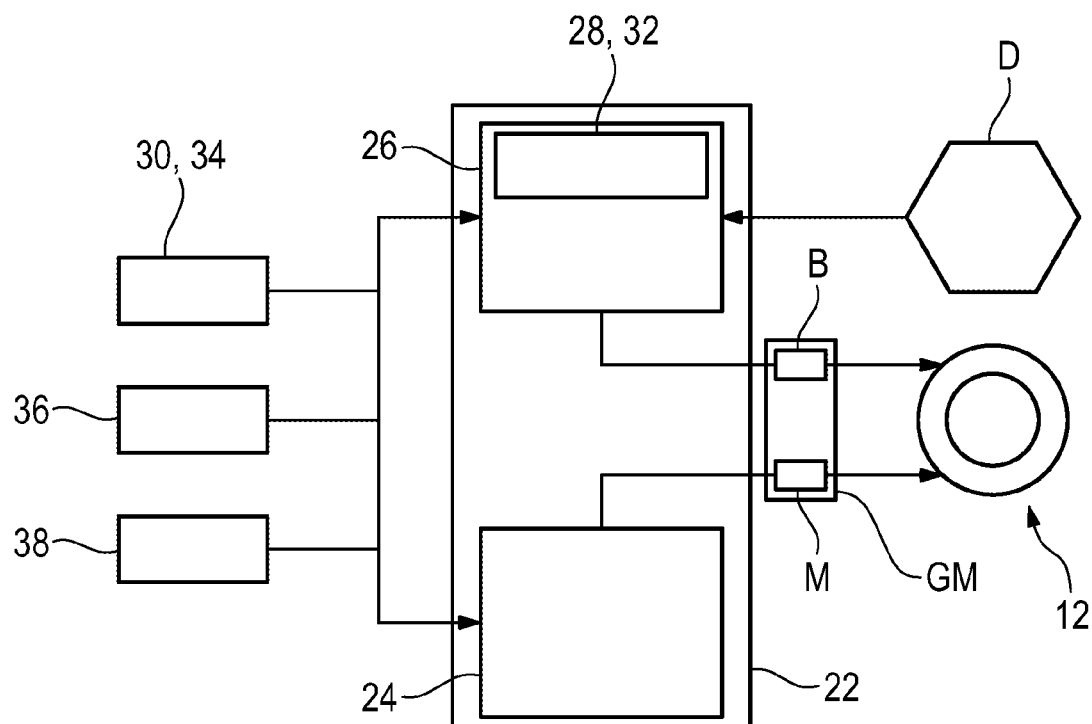
FIG. 2 shows an operational diagram of various components and units of the single-track motor vehicle according to FIG. 1.
Figure 3:
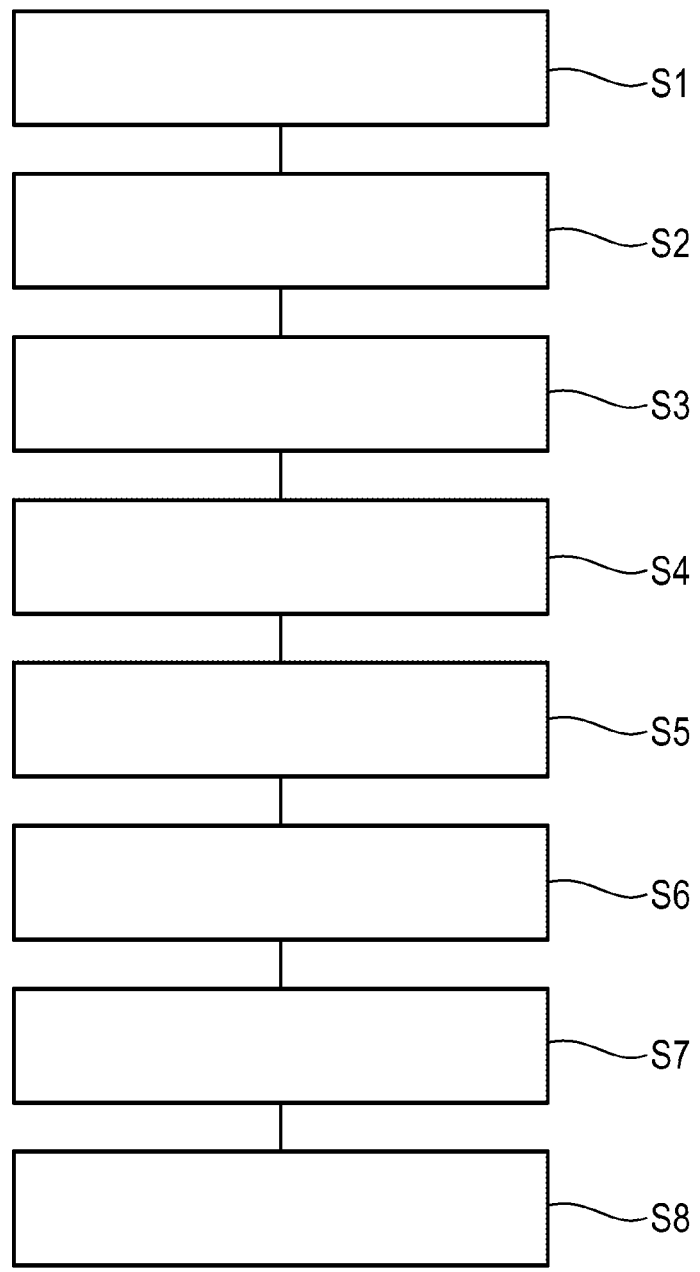
FIG. 3 shows a flow chart of a method according to an embodiment of the invention for decelerating the single-track motor vehicle according to FIG. 1.

By means of FIGS. 2 and 3, a method for decelerating the single-track motor vehicle 10 is explained hereinafter. The goal of the method is to assist and simplify a driving maneuver initiated by a driver of the motor vehicle 10.

The basic principle of the method will be described on the basis of FIG. 2.

The desired driving maneuver is a controlled, intended overbraking of the rear wheel 12, by which a controlled, stable "slide" of the rear wheel 12 is to be generated to thus achieve a stronger deceleration of the motor vehicle than would be possible during a normal initial braking process.

For this purpose, the brake controller 26 or more precisely the brake pressure sensor system 28, 32 of the control unit 22 detects a brake pressure D, which is generated by the driver by actuating the rear wheel brake 14 and/or the front wheel brake 18 and results in a deceleration of the motor vehicle 10.

The brake pressure D at the rear wheel brake 14 and the brake pressure D at the front wheel brake 18 can be different in this case.

The control unit 22 can automatically recognize on the basis of various vehicle parameters that the desired driving maneuver is to be carried out.

Alternatively, it can be communicated to the control unit 12 by a manual input on one of the input devices 40 chronologically before or during the desired driving maneuver that the desired driving maneuver is to be carried out during the next deceleration of the motor vehicle 10 or now.

The control unit 22 subsequently determines, both on the basis of the detected brake pressure D at the rear wheel brake 14 and/or the front wheel brake 18 and also further data of the wheel speed sensor system 30, 34, the steering angle sensor system 36, and the inertial measurement sensor system 38, a total torque GM which is required at the rear wheel 12 to initiate the desired overbraking and accordingly the slide of the rear wheel 12.

The basic concept of the method is to generate a part of the required total torque GM by way of the engine controller 24 and another part of the required total torque GM by way of the brake controller 26.

The engine partial torque M generated by the engine controller 24 and the braking partial torque B generated by the brake controller 26 together result in the required total torque GM at the rear wheel 12.

The individual steps of the method are described in more detail hereinafter on the basis of FIG. 3.

In a step S1, the driver of the motor vehicle 10 actuates the rear wheel brake 14 and/or the front wheel brake 18 to achieve a deceleration of the motor vehicle 10. By actuating the rear wheel brake 14 and/or the front wheel brake 18, the driver generates the brake pressure D at the rear wheel brake 14 or at the front wheel brake 18, respectively.

In a step S2, the control unit 12 recognizes that the driver wishes to execute the desired driving maneuver.

The recognition can take place automatically, on the one hand, or can be manually induced, on the other hand.

The automatic recognition takes place on the basis of various vehicle parameters, for example, the current brake pressure D at the rear wheel brake 14 and/or the front wheel brake 18, a current inertial state of the motor vehicle 10, in particular the current inclination and the current sideslip angle, the current deceleration, and a current velocity of the motor vehicle 10.

In the manual indication, it is communicated to the control unit 12 chronologically before or during the desired driving maneuver by manual actuation of a trigger by the driver that the desired driving maneuver is to be carried out during the next deceleration of the motor vehicle 10 or now—if the motor vehicle 10 is presently being decelerated.

The trigger can be, for example, a manual input by the driver on one of the input devices 40.

Additionally or alternatively, a brief manual actuation of the rear wheel brake 14 by the driver can be used as the trigger.

In a step S3, the total torque GM, which is necessary for initiating the slide of the rear wheel 12, is determined by the control unit 22 on the basis of current measurement data of the brake pressure sensor system 28, 32, the wheel speed sensor system 30, 34, the steering angle sensor system 36, and the inertial measurement sensor system 38.

On the basis of the determined total torque GM, the brake controller 26 ascertains in a step S4, with incorporation of the deceleration of the motor vehicle 10, a setpoint brake pressure $D_{Soll}$, using which the rear wheel brake 14 is to be actuated to generate the braking partial torque B at the rear wheel 12, which is to correspond roughly, i.e., approximately, to the determined total torque GM.

The deceleration is ascertained, on the one hand, by means of the inertial measurement sensor system 38 and, on the other hand, from the current brake pressure B of the front wheel brake 18.

The braking partial torque B is generated at the rear wheel 12 in a step S5 by actuating the rear wheel brake 14 by way of the brake controller 26 or the ABS controlled by the brake controller 26 using the ascertained setpoint brake pressure $D_{Soll}$.

It is accordingly possible that the control unit 12 or the brake controller 26 generates the braking partial torque B at the rear wheel 12 fully automatically, without the driver of the motor vehicle 10 having to actuate the rear wheel brake 14 himself.

In the case of an actuation of the rear wheel brake 14 by the driver, the brake controller 26 can represent a brake pressure limiting of the rear wheel brake 14, by which the brake pressure D applied by the driver is set to the setpoint brake pressure $D_{Soll}$, in particular reduced. This partial function takes the correct metering of the rear wheel brake 14 from the driver, since he only still has to actuate it strongly while the brake controller 26 sets the actually required setpoint brake pressure $D_{Soll}$.

On the basis of the determined total torque GM and optionally on the basis of the current braking partial torque B at the rear wheel 12 generated by the brake controller 26, the engine controller 24 ascertains, in a step S6, with incorporation of a current slip of the rear wheel 12, a current inertial state of the motor vehicle 10, in particular the current inclination and the current sideslip angle, the current deceleration, and a current velocity of the motor vehicle 10, a setpoint value for the slip of the rear wheel 12.

The slip results from a deviation of a circumferential velocity of the rear wheel 12 from a circumferential velocity of the front wheel 16. The slip is thus determined from the detected data of the wheel speed sensor system 30, 34.

The slip control takes place via the regulation of an engine torque, via which the engine partial torque M is in turn generated at the rear wheel 12.

For this purpose, in a step S7, a setpoint torque of the engine 20 is ascertained by the engine controller 24, which sets the wheel speed of the rear wheel 12 in such a way that the setpoint slip is achieved at the rear wheel 12, or in other words, sets the current braking partial torque B at the rear wheel 12 generated by the brake controller 26 to the determined total torque GM by generating the additional engine partial torque M.

In a step S8, the current torque of the engine 20 is regulated to the ascertained setpoint torque, by which the engine partial torque M is generated in addition to the braking partial torque B at the rear wheel 12 generated by the brake controller 26 and thus the ascertained setpoint slip and therefore the determined, required total torque GM is achieved.

The regulation of the torque of the engine 20 can be carried out, for example, by the activation of the entire engine 20, individual cylinder banks, and/or individual cylinders in a way known per se.

Accordingly, the engine controller 24 performs a type of fine adjustment of the braking partial torque B at the rear wheel 12 generated "roughly" by the brake controller 26 to set the current rear wheel torque braking partial torque B) to the determined total torque GM, in particular to increase it.

In sum, the braking partial torque B and the engine partial torque M thus result in the total torque GM.

In summary, the current torque at the rear wheel 12 is roughly set to the required total torque GM by the brake controller 26 and the current torque at the rear wheel 12 generated by the brake controller 26 is finely adjusted to the required total torque GM by the motor controller 24 by regulating the engine torque.

Optionally, various settings, for example, wheel properties such as the tire type, and/or driving modes, for example, sporty mode having particularly strongly pronounced slide behavior, can be performed via the user interface or the input device 40. These settings have influence on the deceleration behavior of the motor vehicle 10 and thus also on the ascertainment of the total torque GM or the partial torques B, M.

What is claimed is:

1. A method for decelerating a single-track motor vehicle, comprising the acts of:
    determining, using a control unit of the motor vehicle, a total torque of a rear wheel of the motor vehicle required to induce a controlled overbraking of the rear wheel to intentionally induce a slide of the motor vehicle at least during initial braking for a curve;
    determining, using the control unit, a braking partial torque and an engine partial torque using the control unit based on total torque; and
    generating, using the control unit, the braking partial torque at the rear wheel by activating a braking system of the motor vehicle and the engine partial torque at the rear wheel by activating an engine of the motor vehicle to induce the controlled overbraking of the rear wheel.

2. The method according to claim 1, wherein
    the act of generating the braking partial torque at the rear wheel includes
        determining, using the control unit, a setpoint brake pressure of the braking system corresponding to the ascertained braking partial torque, and generating the braking partial torque by actuating the brake of the braking system using the brake controller to obtain the determined setpoint brake pressure.

3. The method according to claim 2, wherein
a brake pressure applied by a driver is reduced using the brake controller to the determined setpoint brake pressure.

4. The method according to claim 2, wherein
at least one of the total torque, the braking partial torque, the setpoint brake pressure, or the engine partial torque, or a combination thereof, is determined as a function of a current steering angle of the motor vehicle, a current wheel speed of a front wheel of the motor vehicle, a current wheel speed of the rear wheel of the motor vehicle, a current motor velocity of the motor vehicle, a current slip of the front wheel, a current slip of the rear wheel, a current inertial state of the motor vehicle, a current inclination of the motor vehicle, a current sideslip angle of the motor vehicle, a selected driving mode of the motor vehicle, or a brake pressure applied by the driver at the front wheel, of a combination thereof.

5. The method according to claim 1, wherein
the act of generating the engine partial torque includes
determining, using the control unit, a setpoint torque of the engine corresponding to the determined engine partial torque, and
generating the engine partial torque by regulating the engine using the engine controller to the determined setpoint torque.

6. The method according to claim 5, wherein
the regulation of the engine to the ascertained setpoint torque is carried out by activating all cylinders of the engine, individual cylinders of the engine, or individual cylinder banks of the engine, or a combination thereof.

7. The method according to claim 5, wherein
at least one of the total torque, the braking partial torque, the engine partial torque or the setpoint torque, or a combination thereof, is determined as a function of a current steering angle of the motor vehicle, a current wheel speed of a front wheel of the motor vehicle, a current wheel speed of the rear wheel of the motor vehicle, a current motor velocity of the motor vehicle, a current slip of the front wheel, a current slip of the rear wheel, a current inertial state of the motor vehicle, a current inclination of the motor vehicle, a current sideslip angle of the motor vehicle, a selected driving mode of the motor vehicle, or a brake pressure applied by the driver at the front wheel, of a combination thereof.

8. The method according to claim 1, wherein
the braking partial torque and the engine partial torque in sum equal in the total torque.

9. The method according to claim 1, wherein
the braking system includes a brake controller which is part of the control unit, or
the motor vehicle includes an engine controller which is part of the control unit, or
the control unit includes the brake controller and the engine controller.

10. The method according to claim 1, wherein
the braking system includes an antilock braking system.

11. A single-track motor vehicle, comprising:
a front wheel;
a rear wheel;
a braking system having a front wheel brake and a rear wheel brake;
an engine;
at least one sensor system; and
a control unit coupled to the braking system, the engine, and the sensor system,
wherein the control unit is configured to:
determine a total torque of a rear wheel of the motor vehicle required to induce a controlled overbraking of the rear wheel to intentionally induce a slide of the motor vehicle at least during initial braking for a curve;
determine a braking partial torque and an engine partial torque based on total torque; and
generate the braking partial torque at the rear wheel by activating the braking system of the motor vehicle and the engine partial torque at the rear wheel by activating the engine of the motor vehicle to induce the controlled overbraking of the rear wheel.

12. The single-track motor vehicle according to claim 11, wherein
the sensor system includes a brake pressure sensor system, a steering angle sensor system, an inertial measurement sensor system including at least one of an acceleration sensor and a rotation rate sensor, or a wheel speed sensor system, or a combination thereof.

13. A method for decelerating a single-track motor vehicle, comprising the acts of:
determining, using a control unit of the motor vehicle, a total torque of a wheel of the motor vehicle required for a desired driving maneuver using a control unit of the motor vehicle;
determining, using the control unit, a braking partial torque and an engine partial torque using the control unit based on total torque; and
generating, using the control unit, the braking partial torque at the wheel by activating a braking system of the motor vehicle and the engine partial torque at the wheel by activating an engine of the motor vehicle,
wherein generating the braking partial torque at the wheel includes:
determining, using the control unit, a setpoint brake pressure of the braking system corresponding to the ascertained braking partial torque, and
generating the braking partial torque by actuating the brake of the braking system using the brake controller to obtain the determined setpoint brake pressure.

14. The method according to claim 13, wherein
a brake pressure applied by a driver is reduced using the brake controller to the determined setpoint brake pressure.

* * * * *